United States Patent [19]
Itonaga

[11] Patent Number: 5,623,466
[45] Date of Patent: Apr. 22, 1997

[54] OPTICAL PICKUP APPARATUS WITH SKEW ERROR CONTROL AND OPTICAL INFORMATION RECORDING AND/OR REPRODUCING APPARATUS USING THE SAME

[75] Inventor: Makoto Itonaga, Yokohama, Japan

[73] Assignee: Victor Company of Japan, Ltd., Yokohama, Japan

[21] Appl. No.: 408,169

[22] Filed: Mar. 21, 1995

[30] Foreign Application Priority Data

Mar. 25, 1994 [JP] Japan .................................. 6-079718

[51] Int. Cl.$^6$ .................................................... G11B 7/095
[52] U.S. Cl. ............................... 369/44.32; 369/44.23; 369/54
[58] Field of Search ............................ 369/44.32, 44.35, 369/44.36, 44.23, 110, 112, 44.61, 44.25, 54

[56] References Cited

U.S. PATENT DOCUMENTS

| 4,674,078 | 6/1987 | Otsuka et al. | 369/44.32 |
| 5,442,615 | 8/1995 | Ohsato et al. | 369/44.32 |

FOREIGN PATENT DOCUMENTS 60-121546  6/1985  Japan .

10528  5/1993  WIPO .

*Primary Examiner*—Thang V. Tran
*Attorney, Agent, or Firm*—Lowe, Price, LeBlanc & Becker

[57] ABSTRACT

An optical pickup apparatus comprises: a laser light source for emitting a laser beam; a collimating optical system, having a first optical axis and a predetermined unsatisfied degree of a Abbe's sine condition, for collimating the laser light beam; an objective lens, having a second optical axis, for focusing the laser beam from the collimating optical system on an information holding plane of an optical disc; a detection portion for detecting an amount and a direction of a tilt of the optical disc from a reference; and a control portion for changing the first optical axis with respect to the second optical axis in accordance with the detected amount and direction of the tilt. A lens system of the collimating optical system is made to have an unsatisfied Abbe's sine condition to a predetermined degree and the optical axis of the lens system is tilted or shifted to compensate the comma aberration developed due to the tilt of the optical disc. Thus, it is sufficient to shift or tilt the optical axis of only the lens system by an actuator, so that a mass of optical components to be controlled is small. Therefore, a high frequency response is provided and the tilt servo in the tangential direction of the optical disc is provided. An optical disc apparatus using the optical pickup apparatus is also disclosed.

9 Claims, 4 Drawing Sheets

FIG. 7

| DISC TILT ANGLE [deg] | WAVEFRONT ABERRATION WFE [$\lambda$] BEFORE COMP | WAVEFRONT ABERRATION WFE [$\lambda$] AFTER COMP | IMPROVED DEGREE [1/*] |
|---|---|---|---|
| 0.0 | 0.0017 | 0.0017 | — |
| 0.1 | 0.0191 | 0.0019 | 1/10.3 |
| 0.2 | 0.0381 | 0.0036 | 1/10.5 |
| 0.3 | 0.0572 | 0.0049 | 1/11.8 |
| 0.4 | 0.0763 | 0.0068 | 1/11.2 |
| 0.5 | 0.0953 | 0.0091 | 1/10.5 |
| 0.6 | 0.1144 | 0.0118 | 1/9.7 |

OPTICAL PICKUP APPARATUS WITH SKEW ERROR CONTROL AND OPTICAL INFORMATION RECORDING AND/OR REPRODUCING APPARATUS USING THE SAME

BACKGROUND OF THE INVENTION

1. Field of the Invention

This invention relates to an optical pickup apparatus for reading and recording information on an optical disc and an optical disc apparatus, using the optical pickup apparatus, for reproducing and recording information on an optical disc.

2. Description of the Prior Art

An optical pickup, having a radial tilt servo, for reading information on a laser disc is known. In this prior art optical pickup, a sensor detects a tilt in the radial direction of the optical laser disc and a whole optical system of the optical pickup is mechanically tilted to compensate the tilt of the optical disc in the radial direction.

In the laser disc system, a signal is recorded with FM modulation, so that a tangential tilt of the laser disc does not largely affect the reproduction of the signal. Therefore, only the tilt in the radial direction is compensated in the laser disc system.

As mentioned above, the radial tilt servo cannot provide a high speed response because the tilt of the whole optical system is controlled, that is, the mass is too large. However, in the laser disc system, because the tilt in the radial direction is caused by a simple bend from the inner circumference to the outer circumference in the most of all cases, a high speed response is not required and is not in question now.

In an optical disc system for recording a digital signal, comprising an optical system having a high numerical aperture NA to increase a recording density, a tilt in the tangential direction of the optical disc should be compensated because the tilt in the tangential direction directly affects the reproduction quality of the recorded digital signal. This tangential tilt occurs at a higher frequency than the rotational frequency of the optical disc. Therefore, the tangential tilt compensation and the radial tilt compensation require a high frequency response.

SUMMARY OF THE INVENTION

The aim of this invention is to provide an improved optical pickup apparatus and an improved optical disc apparatus using the optical pickup apparatus.

According to the present invention there is provided a first optical pickup apparatus comprising: a laser light source for emitting a laser beam; a collimating optical (lens) system, having a first optical axis and a predetermined unsatisfied degree of a Abbe's sine condition, for collimating the laser light beam; an objective lens, having a second optical axis, for focusing the laser beam from the collimating optical system on an information holding plane of an optical disc; a detection portion for detecting an amount and a direction of a tilt of the optical disc from a reference (including a tilt between the optical disc and the objective lens, hereinafter); and a control portion for changing the first optical axis with respect to the second optical axis in accordance with the detected amount and direction of the tilt.

According to this invention there is also provided a second optical pickup apparatus comprising: a laser light source for emitting a laser beam; a collimating optical (lens) system, having first and second groups of lenses, for collimating the laser light beam; an objective lens, having a second optical axis, for focusing the laser beam from the collimating optical system on an information holding plane of an optical disc, the first group lenses adjacent to the objective lens having a predetermined unsatisfied degree of a Abbe's sine condition having a first optical axis and a first optical axis; a detection portion for detecting an amount and a direction of a tilt of the optical disc from a reference; and a control portion for changing the first optical axis with respect to the second optical axis in accordance with the detected amount and direction of the tilt.

In the first or the second optical pickup apparatus, the detection portion detects the tilt in a tangential and/or radial direction of the optical disc and the control portion changes the first optical axis with respect to the second optical axis in the tangential (and/or radial) direction.

In the first or the second optical pickup apparatus, the control portion shifts the first optical axis from the second optical axis.

In the first or the second optical pickup apparatus, the control portion tilts the first optical axis from the second optical axis.

A lens system of the collimating optical system is made to have an unsatisfied Abbe's sine condition to a predetermined degree and the optical axis of the lens system is tilted or shifted to compensate the comma aberration developed due to the tilt of the optical disc. Thus, it is sufficient to shift or tilt the optical axis of only the lens system by an actuator, so that a mass of optical components to be controlled is small. Therefore, a high frequency response is provided and the tilt servo in the tangential (also radial direction high frequency response) direction of the optical disc is provided.

According to this invention, there is further provided an optical disc apparatus for reproducing and recording information on an optical disc, comprising: a rotating portion for rotating an optical disc; an optical pickup for reproducing and recording the information; and a carriage portion for carrying the optical pickup in a radial direction of the optical disc, the optical pickup having; a laser light source for emitting a laser beam; a collimating optical system, having a first optical axis and a predetermined unsatisfied degree of a Abbe's sine condition, for collimating the laser light beam; an objective lens, having a second optical axis, for focusing the laser beam from the collimating optical system on an information holding plane of an optical disc; a detection portion for detecting an amount and a direction of a tilt of the optical disc from a reference; and a control portion for changing the first optical axis with respect to the second optical axis in accordance with the detected amount and direction of the tilt.

BRIEF DESCRIPTION OF THE DRAWINGS

The objects and features of the present invention will become more readily apparent from the following detailed description taken in conjunction with the accompanying drawings in which:

FIG. 7 shows a table of this embodiment showing a measurement result of compensating the tilt of the optical disc 5.

The same or corresponding elements or parts are designated with like references throughout the drawings.

DETAILED DESCRIPTION OF THE INVENTION

Prior to describing an embodiment, a concept of this invention will be described. A collimating optical system arranged between a laser source and an objective lens has a predetermined unsatisfied degree of Abbe's sine condition, a tilt of an optical disc is detected, and an optical axis of the collimating optical system is changed with respect to that of the objective lens to develop a first comma aberration intentionally to cancel a second comma aberration developed due to a tilt (bend) of the optical disc.

Hereinbelow will be described an embodiment of this invention.

Figure 1:
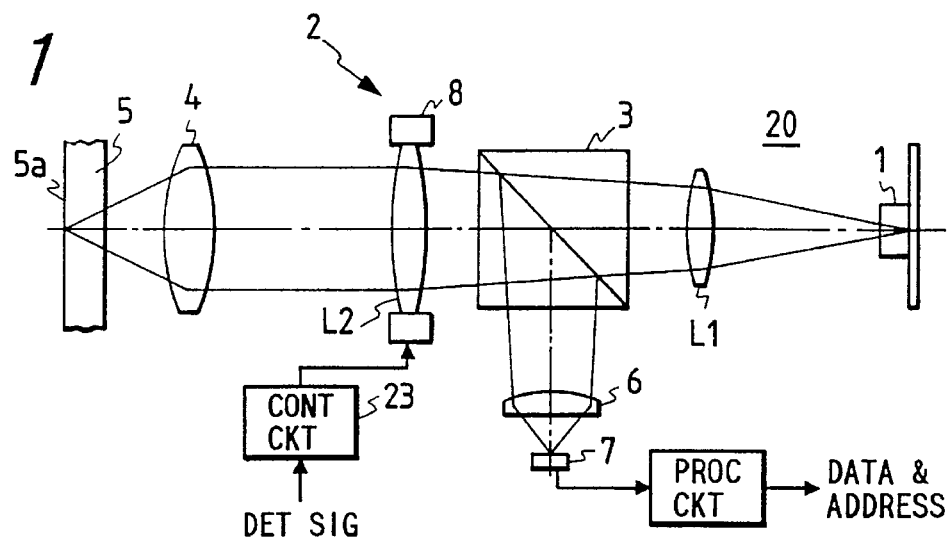
FIG. 1 is a cross-sectional view of an embodiment of an optical pickup apparatus.

FIG. 1 is a cross-sectional view of the embodiment of an optical pickup apparatus. A laser light source 1 emits a laser light beam. A collimating optical system 2 has a first convex lens system L1 and a second convex lens system L2 for collimating the laser light beam. A beam splitter 3 arranged between the first and second convex lens systems L1 and L2 splits beams thereinto. An object lens 4 focuses the laser beam from the collimating optical system 2 on an information holding plane 5a of an optical disc 5.

The laser light beam emitted by the laser light source 1 is slightly converged by the first convex lens system L1 and transmitted through the beam splitter 3, and the second convex lens system L2 supplies a collimated laser light beam to the objective lens 4. The objective lens 4 focus the laser light beam on the information holding plane 5a. The laser light beam reflected by the information holding plane 5a is collimated by the objective lens 4 and slightly converged by the second convex lens system L2. The reflected laser beam from the second convex lens system L2 enters the beam splitter 3 again. The beam splitter 3 reflects the laser light beam diagonally. A convex cylindrical lens 6 focus the reflected laser light beam onto a photodetector 7.

The second convex lens system L2 is supported by an actuator 8 for shifting or tilting an optical axis of the second convex lens system L2 with respect to an optical axis of the objective lens 4. The actuator 8 compensates both the tangential tilt and the radial tilt by using a two-dimensional drive actuator or a two-dimensional tilt actuator as necessary.

Figure 2A:
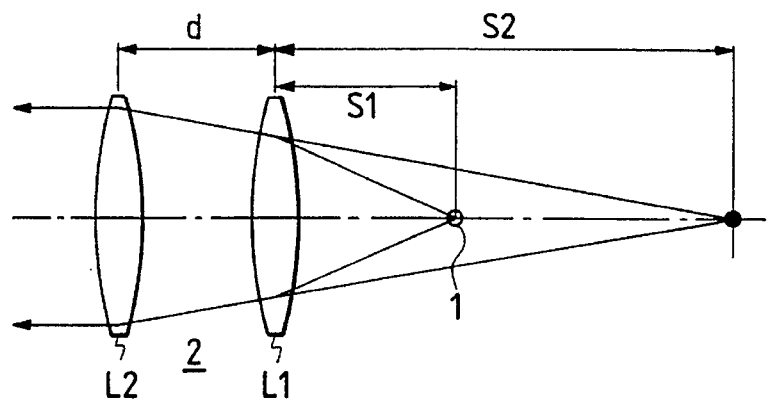
FIGS. 2A to 2C are partial cross-sectional views of this embodiment viewed from the same direction as FIG. 1, wherein a beam splitter shown in FIG. 1 is omitted.
Figure 2B:
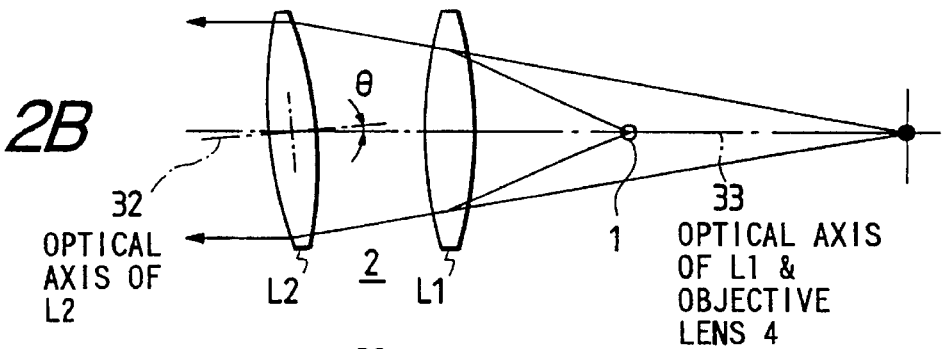
Figure 2C:
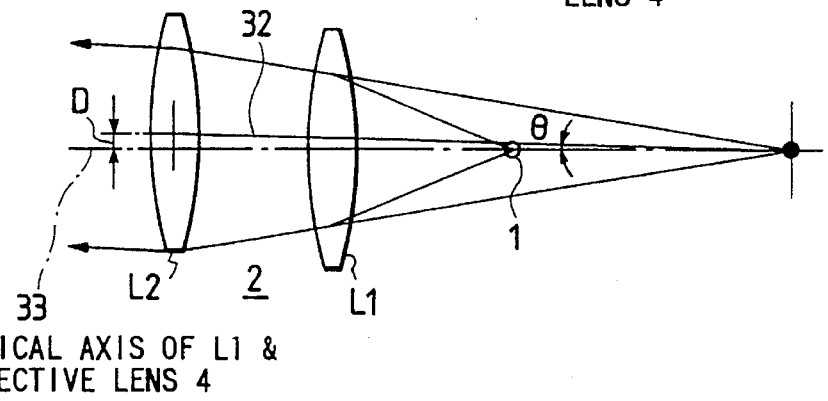

The collimating optical system will be described more specifically. FIGS. 2A to 2C are partial cross-sectional views of this embodiment wherein the collimating optical system 2 is shown with the beam splitter 3 omitted. FIG. 2A shows a first condition where the optical axis of the second convex lens system L2 agrees with that of the objective lens 4. FIG. 2B shows a second condition where the optical axis 32 of the second convex lens system L2 is tilted from the objective lens 4. FIG. 2C shows a third condition where the optical axis 32 of the second convex lens system L2 is shifted from that of the objective lens 4. Data of the collimating optical system 2 having the first and second convex lens systems L1 and L2 are as follows:

Total focal length f=35 mm

The first convex lens system L1 a focal length f1=60 mm; and

Abbe's sine condition is satisfied at a conjugate ratio $S1/S2=\frac{1}{2}$

The second convex lens system L2 a focal length f2=70 mm;

Abbe's sine condition is unsatisfied at an infinite conjugate ratio (a degree of unsatisfactoriness is −0.6); and a distance between these lenses: d=10 mm.

As described, the first convex lens system L1 is so designed that its spherical aberration is suppressed and further the Abbe's sine condition is satisfied. Therefore, a requirement for a relative position accuracy between the laser light source 1 and the first convex lens system L1 is loose because an aberration of an object outside the optical axis increases gently with an increase in a distance from the optical axis.

Figure 3:
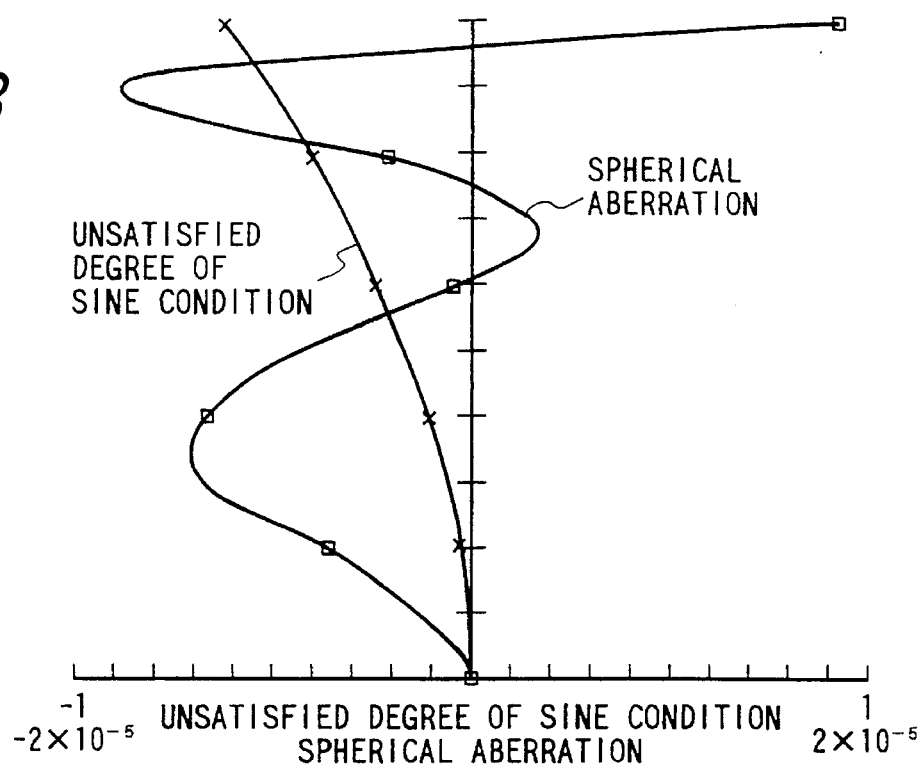
FIG. 3 shows characteristic curves of this embodiment representing a spherical aberration and a degree of unsatisfactoriness in Abbe's sine condition of the second convex lens system.

FIG. 3 shows characteristic curves of this embodiment representing a spherical aberration and a degree of unsatisfactoriness in Abbe's sine condition of the second convex lens system L2. As shown in FIG. 3, the spherical aberration of the second convex lens system L2 is suppressed as much as possible. While the Abbe's sine condition at an infinite conjugate ratio is unsatisfied slightly.

Figure 4:
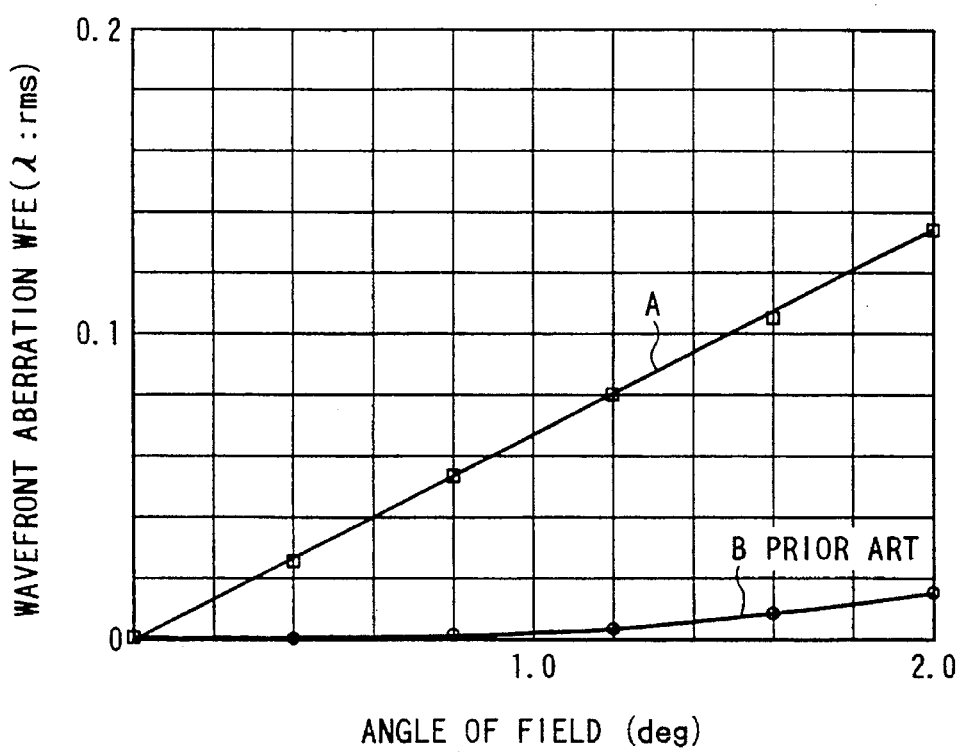
FIG. 4 shows a characteristic curve A of this embodiment representing a relation between a wavefront aberration (rms) and an angle of field of the second convex lens and a characteristic curve B of a prior art convex lens representing a relation between a wavefront aberration and an angle of field.

FIG. 4 shows a characteristic curve A of this embodiment representing a relation between a wavefront aberration (rms) and an angle of field of the second convex lens system L2 and a characteristic curve B of a prior art convex lens system representing a relation between a wavefront aberration and an angle of field wherein the prior art convex lens system is made to satisfy most of all specifications of the second convex lens system L2 except that the Abbe's sine condition is satisfied.

The inventor considers that the difference between the characteristic curves A and B represents the effect of comma aberration and an astigmatism does not effect to this difference. As mentioned, in order to only develop the comma aberration with the astigmatism suppressed, it is favourable in designing to make the focal length f2 of the second convex lens system L2 longer by distributing refractive powers of lenses to a plurality of lens systems, that is, the first and second convex lens systems L1 and L2.

As mentioned, the second convex lens system L2 shows a characteristic that a comma aberration simply increases with an increase in the angle of field of the second convex lens system L2. Therefore, the tilt of the optical axis 32 of the second convex lens system L2 from the optical axis 33 of the laser light source 1, the first convex lens system L1, and the objective lens 4 by a angle θ as shown in FIG. 2B develops a desired degree of the comma aberration. Moreover, as shown in FIG. 2C, shifting the optical axis 32 of the second convex lens system L2 from the optical axis 33 by D develops the comma aberration as similar to the case where the optical axis 32 is tilted.

That is, the comma aberration occurring due to the tilt of the optical disc 5 is suppressed by the controlling the angle of tilt of the optical axis 32 of the second convex lens system L2 from the optical axis 33 or the amount D of the shift in accordance with the amount and a direction of the comma aberration occurring due to the tilt of the optical disc 5.

Figure 5:
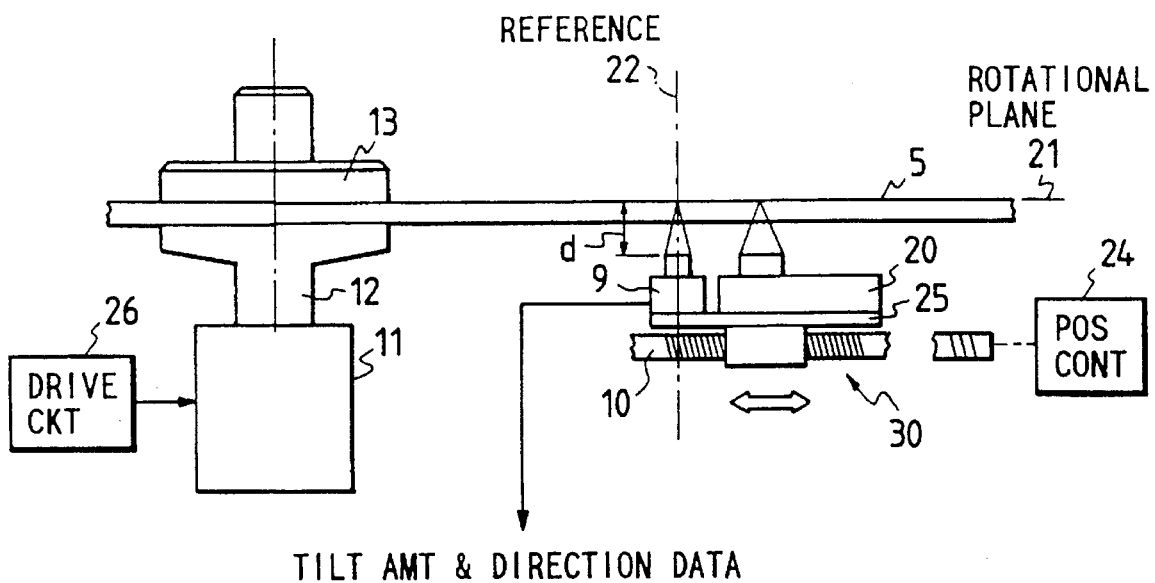
FIG. 5 is an illustration of this embodiment showing an optical disc apparatus using the optical pickup apparatus of this embodiment.

FIG. 5 is an illustration of this embodiment showing an optical disc apparatus using the optical pickup apparatus of this embodiment. The optical disc 5 is placed on a spindle 12 and fixed by a cramper 13. A motor 11 rotates the optical disc 5 under control of a drive circuit 26. The optical disc 5 is traced by the optical pickup 20 mounted on a carriage 25 moved by a carriage mechanism 30 controlled by a position control circuit 24. The carriage 25 travels a detector 9 also. The detector 9 detects the amount and direction of tilt of the information holding plane 5a from the rotational plane 21 or the reference 22.

In the above mentioned embodiment, the detector 9 is provided separately. However, it is also possible that the photodetector 7 can detects the tilt of the optical disc 5.

Figure 6:
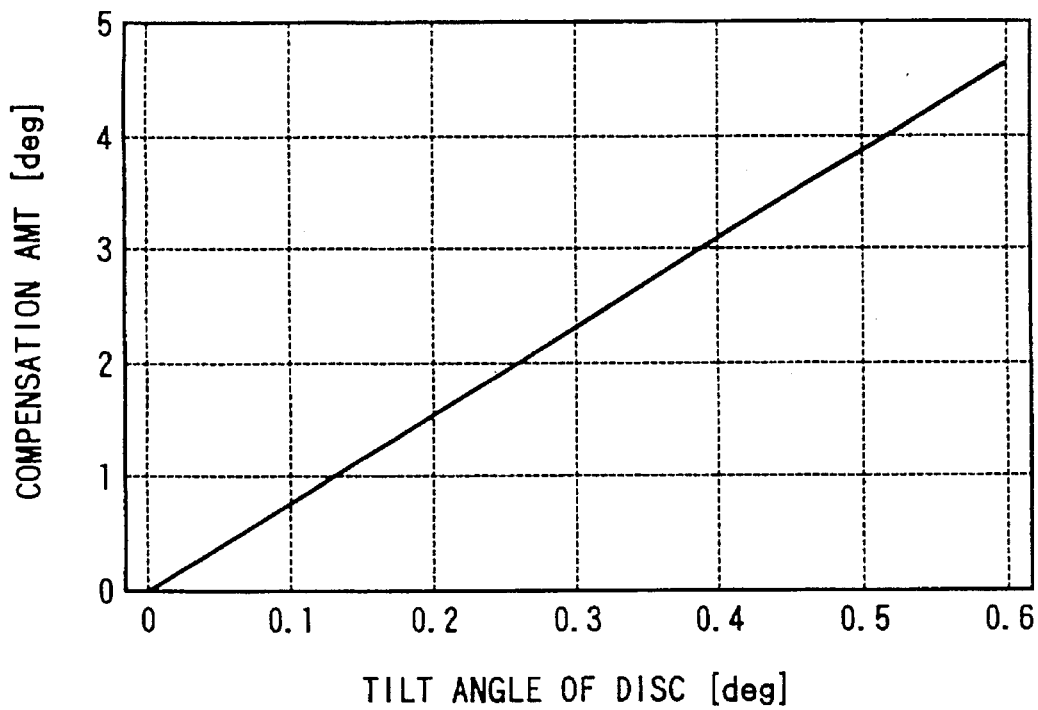
FIG. 6 shows a relation of this embodiment between the tilt angle of the optical disc and a tilt angle of the second convex lens system necessary for compensating the comma aberration occurring due to the tilt of the optical disc.

FIG. 6 shows a relation of this embodiment between the tilt angle of the optical disc 5 and a tilt angle of the second convex lens system L2 necessary for compensating the comma aberration occurring due to the tilt of the optical disc 5. FIG. 7 shows a table of this embodiment showing a measurement result of compensating the tilt of the optical disc 5. The first column of the table represents a tilt of the optical disc [deg], the second column represents a wavefront aberration amount (rms) developed due to the tilt of the optical disc 5 before compensation, the third column represents a wavefront aberration amount (rms) developed due to the tilt of the optical disc 5 after compensation, and the fourth column represents an improved degree of the compensation.

As shown in FIG. 7, the wavefront aberration amount is suppressed to a degree of about a tenth of the aberration amount in the non-compensated condition.

In the above mentioned embodiment, the collimating optical system comprises the first and second convex lens systems L1 and L2. However, the first convex lens system L1 can be omitted.

Moreover, in the above mentioned embodiment, the Abbe's sine condition of the second convex lens system L2 is made unsatisfied to a predetermined degree. However, it is also possible that the Abbe's sine condition of the first convex lens system L1 is made unsatisfied to a predetermined degree and the optical axis of the first convex lens system L1 is tilted to compensate the tilt of the optical disc 5. However, as mentioned in the embodiment, if the tilting or shifting is performed to the second convex lens system L2 arranged on the side of the objective lens 4 from the beam splitter 3, the beam spot on the photodetector 7 does not move with the tilting or the shifting the second convex lens system L2, so that a tracking detection and a focus detection through the photodetector 7 can be effected conveniently.

In the optical pickup apparatus of this invention, a lens system in the collimating optical system is made to have an unsatisfied Abbe's sine condition to a predetermined degree and the optical axis of the lens system is tilted or shifted to compensate the comma aberration developed due to the tilt of the optical disc 5. Therefore, it is sufficient that only a portion of the collimating optical system is shifted or tilt by an actuator, so that a mass of optical components to be controlled is small, so that a high frequency response on the tilt servo is provided and therefore, the tilt servo in the tangential direction of the optical disc is provided.

What is claimed is:

1. An optical pickup apparatus comprising:
   a laser light source for emitting a laser beam;
   an optical collimating system, having a first optical axis and a predetermined unsatisfied degree of a Abbe's sine condition, for collimating said laser light beam;
   an objective lens, having a second optical axis, for focusing said laser beam from said collimating optical system on an information holding plane of an optical disc;
   a detection portion for detecting an amount and a direction of a tilt of said optical disc from a reference; and
   a control portion for controlling a lens of said optical collimating system, thereby changing said first optical axis with respect to said second optical axis in accordance with the detected amount and direction of said tilt.

2. An optical pickup apparatus as claimed as claim 1, wherein said detection portion detects said tilt in a tangential direction of said optical disc and said control portion changes said first optical axis with respect to said second optical axis in said tangential direction.

3. An optical pickup apparatus as claimed as claim 1, wherein said control portion shifts said first optical axis from said second optical axis.

4. An optical pickup apparatus as claimed as claim 1, wherein said control portion tilts said first optical axis from said second optical axis.

5. An optical pickup apparatus comprising:
   a laser light source for emitting a laser beam;
   an optical collimating system, having first and second groups of lenses, for collimating said laser light beam;
   an objecting lens, having a second optical axis, for focusing said laser beam from said collimating optical system on an information holding plane of an optical disc, said first group of lenses adjacent to said objective lens having a predetermined unsatisfied degree of a Abbe's sine condition having a first optical axis;
   a detection portion for detecting an amount and a direction of a tilt of said optical disc from a reference; and
   a control portion for controlling one of said first and second groups of lenses, thereby changing said first optical axis with respect to said second optical axis in accordance with the detected amount and direction of said tilt.

6. An optical pickup apparatus as claimed as claim 5, wherein said detection portion detects said amount of said tilt in a tangential direction of said optical disc and said control portion changes said first optical axis with respect to said second optical axis in said tangential direction.

7. An optical pickup apparatus as claimed as claim 5, wherein said control portion shifts said first optical axis from said second optical axis.

8. An optical pickup apparatus as claimed as claim 5, wherein said control portion tilt said first optical axis from said second optical axis.

9. An optical disc apparatus for reproducing and recording information on an optical disc, comprising:
   a rotating portion for rotating an optical disc;
   an optical pickup for reproducing and recording said information; and
   a carriage portion for carrying said optical pickup in a radial direction of said optical disc, said optical pickup having;
   a laser light source for emitting a laser beam;
   an optical collimating system, having a first optical axis and a predetermined unsatisfied degree of a Abbe's sine condition, for collimating said laser light beam;

an objective lens, having a second optical axis, for focusing said laser beam from said collimating optical system on an information holding plane of an optical disc;

a detection portion for detecting an amount and a direction of a tilt of said optical disc from a reference; and a control portion for controlling a lens of said optical collimating system, thereby changing said first optical axis with respect to said second optical axis in accordance with the detected amount and direction of said tilt.

* * * * *